United States Patent
MacDonald et al.

(10) Patent No.: US 12,497,116 B2
(45) Date of Patent: Dec. 16, 2025

(54) HOLDING GAGE ASSEMBLIES FOR USE IN MEASURING VEHICLE PANELS

(71) Applicant: Toyota Motor Engineering & Manufacturing North America, Inc., Plano, TX (US)

(72) Inventors: Christopher J. MacDonald, Lexington, KY (US); Miguel R. Hernandez, San Antonio, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 405 days.

(21) Appl. No.: 17/724,016

(22) Filed: Apr. 19, 2022

(65) Prior Publication Data

US 2023/0331325 A1 Oct. 19, 2023

(51) Int. Cl.
*B62D 65/02* (2006.01)
*G01B 5/008* (2006.01)
*G01B 5/00* (2006.01)

(52) U.S. Cl.
CPC .......... *B62D 65/028* (2013.01); *G01B 5/008* (2013.01); *G01B 5/0004* (2013.01); *G01B 5/0025* (2013.01)

(58) Field of Classification Search
CPC .... G01B 5/008; G01B 5/0004; G01B 5/0002; G01B 5/0025; B62D 65/028; B62D 65/026; B62D 65/06
See application file for complete search history.

(56) References Cited

U.S. PATENT DOCUMENTS

| 5,883,313 A * | 3/1999 | Ercole | G01B 7/287 73/865.8 |
|---|---|---|---|
| 6,267,341 B1 * | 7/2001 | Fleming | B23Q 17/20 248/181.2 |
| 7,913,370 B2 | 3/2011 | Savoy | |
| 8,905,390 B2 | 12/2014 | Yeum | |
| 11,644,296 B1 * | 5/2023 | Chang | G01B 5/0004 33/557 |
| 2013/0062823 A1 * | 3/2013 | Boyd | B25H 1/16 269/309 |
| 2020/0116476 A1 * | 4/2020 | Bomba | G01B 7/345 |

FOREIGN PATENT DOCUMENTS

| CN | 210555261 U | 5/2020 |
|---|---|---|
| DE | 10326008 A1 | 12/2004 |
| EP | 2588364 B1 | 5/2016 |
| KR | 10-2019-0074176 A | 6/2019 |

* cited by examiner

*Primary Examiner* — Christopher J. Besler
(74) *Attorney, Agent, or Firm* — Dinsmore & Shohl LLP

(57) ABSTRACT

A method of supporting vehicle panel assemblies of different lengths for a measuring operation using a coordinate measurement machine is provided. The method includes supporting a first vehicle panel assembly having a first length on a holding gage assembly comprising horizontally aligned datum locations of a first set of datum members that support the first vehicle panel assembly thereon. A second vehicle panel assembly having a second length that is greater than the first length is supported on the datum locations of the first set of datum members. The second vehicle panel assembly extends longitudinally beyond the datum locations of the first set of datum members to at least one datum location of a second set of datum members.

9 Claims, 3 Drawing Sheets

HOLDING GAGE ASSEMBLIES FOR USE IN MEASURING VEHICLE PANELS

TECHNICAL FIELD

The present specification generally relates to holding gage assemblies and, more specifically, to holding gage assemblies for use in measuring vehicle panels.

BACKGROUND

Prior to installation on vehicles, vehicle panels may be measured for inspection purposes to ensure that the vehicle panels meet certain specifications. Coordinate measurement machines (CMMs), for example, may be used to measure vehicle panels so that the measurements can be checked against the specifications.

A vehicle model may have a number of body styles. Different body styles may be vehicle panels of different shapes and sizes. Often, vehicle panels of different body styles require different fixtures for holding the vehicle panels for measurement purposes.

What is needed are holding gage assemblies that can be used in measuring vehicle panels of different sizes and/or shapes.

SUMMARY

In accordance with one embodiment, a method of supporting vehicle panel assemblies of different lengths for a measuring operation using a coordinate measurement machine is provided. The method includes supporting a first vehicle panel assembly having a first length on a holding gage assembly comprising horizontally aligned datum locations of a first set of datum members that support the first vehicle panel assembly thereon. A second vehicle panel assembly having a second length that is greater than the first length is supported on the datum locations of the first set of datum members. The second vehicle panel assembly extends longitudinally beyond the datum locations of the first set of datum members to at least one datum location of a second set of datum members.

In accordance with another embodiment, a holding gage assembly used to measure vehicle panels assemblies of different lengths includes a gage body including a base configured to rest on a floor, a pair of support rails that extend vertically from the base and one or more horizontally-extending cross-rails that extend between the vertically-extending support rails and define a top of the gage body. A plurality of datum members extend vertically outward from the one or more cross-rails to individual datum locations. The plurality of datum members include a first set of datum members having individual datum locations that are used for supporting multiple ones of the vehicle panel assemblies having different lengths. The plurality of datum members include a second set of datum members having individual datum locations that are spaced longitudinally from the first set of datum members and used for supporting only one or some of the multiple ones of the vehicle panel assemblies having different lengths.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Embodiments described herein are directed to holding gage assemblies that can be used to measure vehicle panels or vehicle panel assemblies of different shapes and/or sizes. The holding gage assemblies include a gage body that includes a pair of vertically-extending support rails and one or more horizontally-extending cross-rails that extend between the vertically-extending support rails and define a top of the gage body. A plurality of datum members extend vertically outward from the one or more cross-rails to individual datum locations. The plurality of datum members include a first set of datum members having individual datum locations that are used for multiple ones of the vehicle panel assemblies having different lengths. The plurality of datum members include a second set of datum members having individual datum locations that are used for only one or some of the multiple ones of the vehicle panel assemblies having different lengths.

Figure 1:
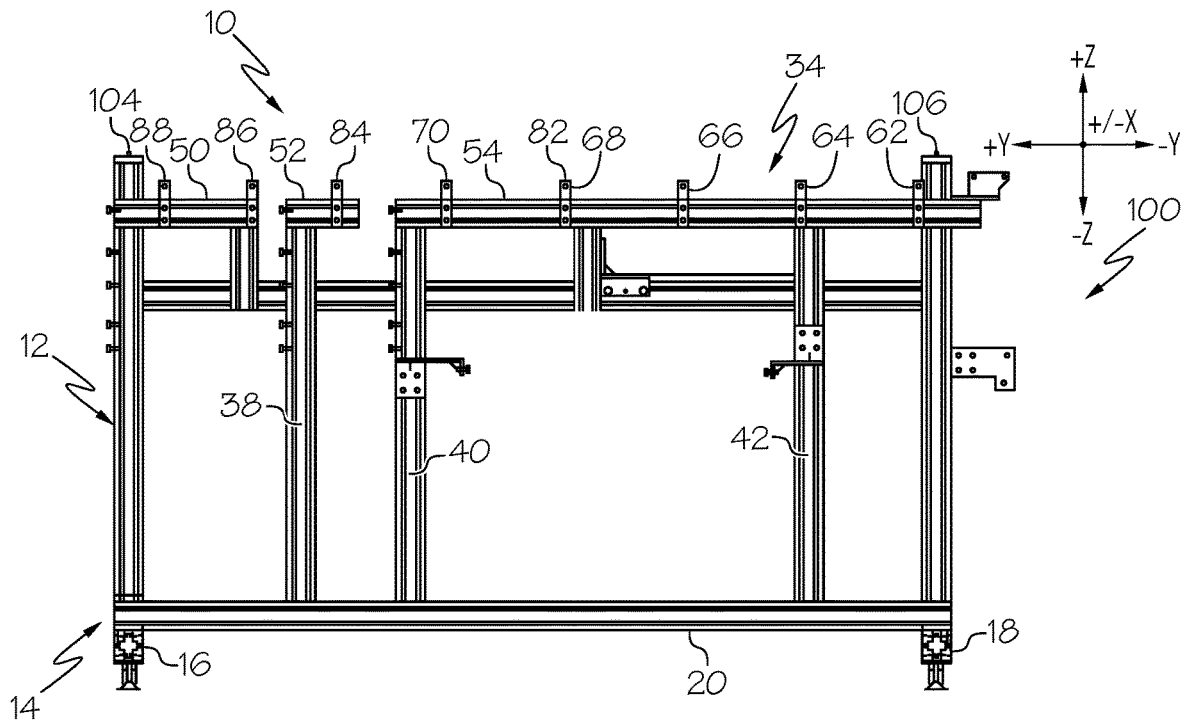
FIG. 1 depicts a side view of a holding gage assembly for supporting a vehicle panel for a measuring operation, according to one or more embodiments shown and described herein.

As used herein, the term "longitudinal direction" refers to the forward-rearward direction of the vehicle panel assembly (i.e., in the +/−Y direction depicted in FIG. 1). The term "lateral direction" refers to the cross-vehicle panel assembly direction (i.e., in the +/−X direction depicted in FIG. 1), and is transverse to the longitudinal direction. The term "vertical direction" refers to the upward-downward direction of the vehicle panel assembly (i.e., in the +/−Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Figure 2:
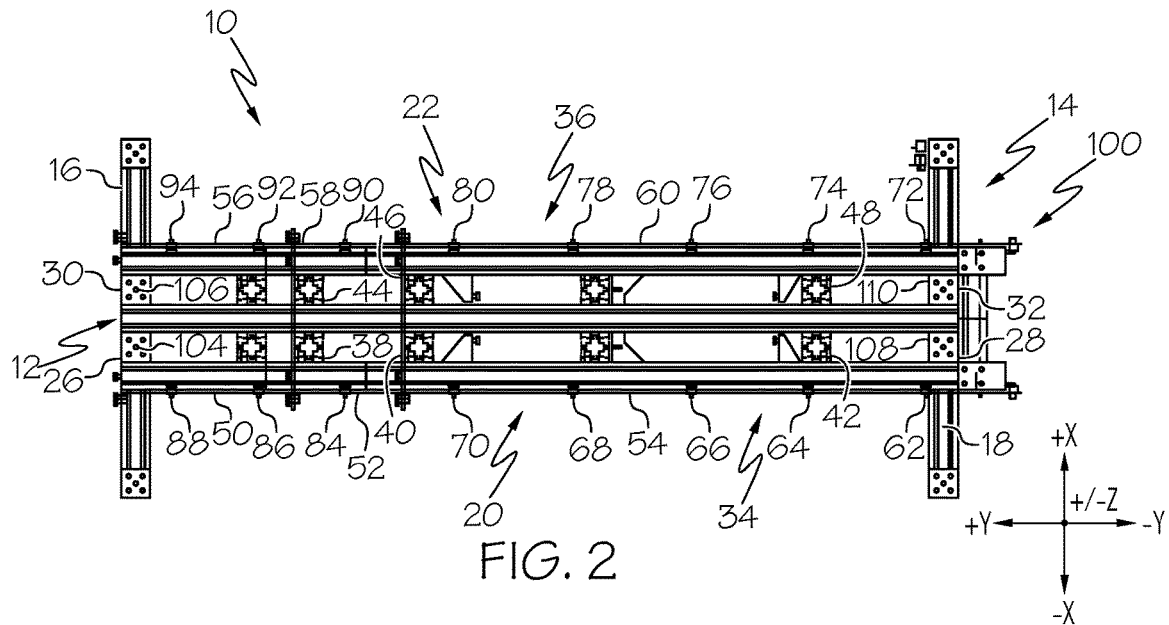
FIG. 2 depicts a top view of the holding gage assembly of FIG. 1, according to one or more embodiments shown and described herein.
Figure 3:
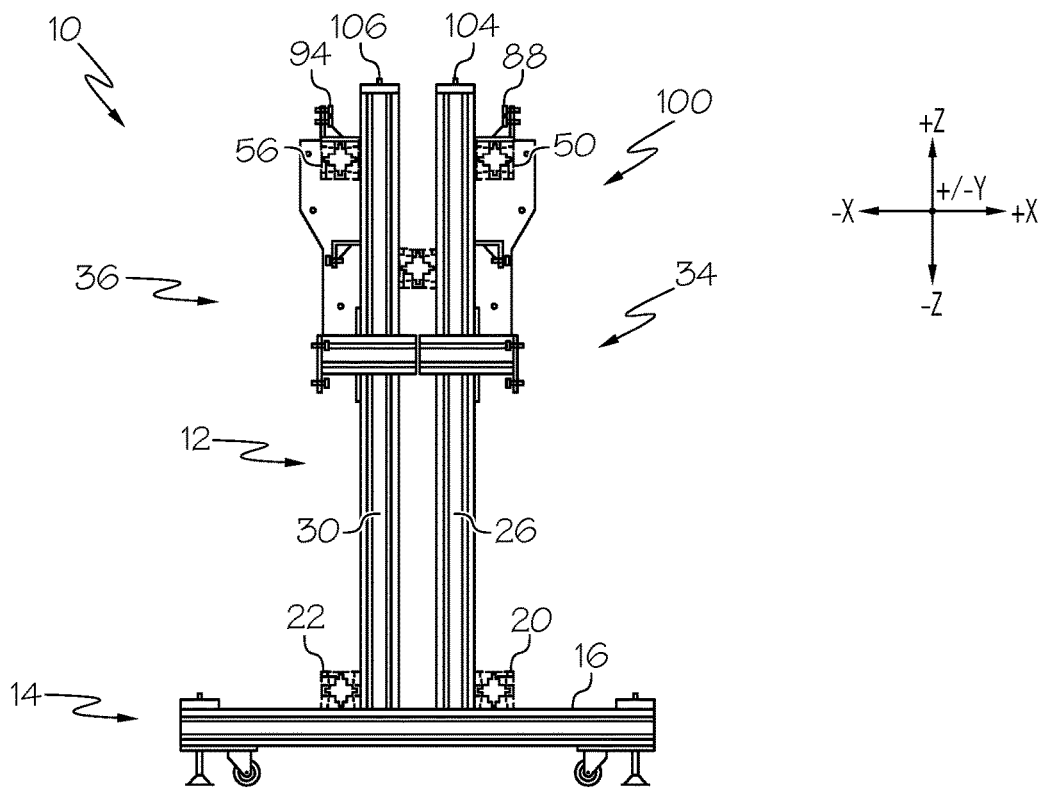
FIG. 3 depicts an end view of the holding gage assembly of FIG. 1, according to one or more embodiments shown and described herein.

Referring to FIGS. 1-3, a holding gage assembly 10 includes a gage body 12 that is formed of multiple, interconnected rails. The gage body 12 includes a base 14 that includes a pair of feet 16 and 18 and lower cross-rails 20 and 22 that extend horizontally between the feet 16 and 18 forming a bottom of the gage body 12 that rests on the floor. Extending vertically from the feet 16 and 18 are end support rails 26, 28, 30 and 32. In the illustrated example, each side 34 and 36 of the gage body 12 includes a pair of end support rails 26, 28 and 30, 32. Each side 34 and 36 of the gage body 12 also includes intermediate vertically-extending support rails 38, 40, 42 and 44, 46, 48. The intermediate support rails 38, 40 and 42 extend vertically from the lower cross-rail 20 and the intermediate support rails 44, 46 and 48 extend vertically from the lower cross-rail 22. The end support rails 26, 28, 30 and 32 and the intermediate support rails 38, 40, 42, 44, 46 and 48 of each side 34 and 36 support one or more upper cross-rails 50, 52, 54 and 56, 58, 60 that form a top of the gage body 12.

A plurality of datum members extend vertically outward from the upper cross-rails 50, 52 54 and 56, 58, 60 to individual datum locations. In particular, each side 34 and 36 of the gage body 12 includes a first set of datum members 62, 64, 66, 68, 70 and 72, 74, 76, 78, 80 having individual datum locations 82 (FIG. 1) that are common for the vehicle panel assemblies of different lengths. Each side 34 and 36 of the gage body 12 also includes a second set of datum members 84, 86, 88 and 90, 92, 94 having individual datum locations 82 that are each used for only one or some of the vehicle panel assemblies of different lengths, as will be described below. As used herein, the term "datum location" refers to a surface of the datum members upon which the vehicle panel assemblies rest that is fixed relative to the rest of the gage body. The first set of datum members 62, 64, 66, 68, 70 and 72, 74, 76, 78, 80 may be spaced equidistantly from one another and the second set of datum members 84, 86, 88 and 90, 92, 94 may be spaced equidistantly from each other and aligned longitudinally with one another. In the illustrated embodiment, the spacing of the first set of datum members 62, 64, 66, 68, 70 and 72, 74, 76, 78, 80 is different (e.g., larger) than the spacing of the second set of datum members 84, 86, 88 and 90, 92, 94.

The gage body 12 further includes clamp arm mounting structure 100 for removably attaching a clamp arm 102 (FIG. 4) that can be used to fix a position of the vehicle panel assembly once supported by the gage body 12. Each end support rail 26, 28, 30 and 32 includes an alignment datum 104, 106, 108 and 110 that can be used by the user to digitally align a coordinate measurement machine (CMM) to a particular location and orientation of the holding gage assembly 10. For example, in some embodiments, the gage body 12 may be placed on casters or wheels and moved between locations. A portable CMM, such as commercially available from FARO Technologies, Inc., Lake Mary, FL, can touch or otherwise detect one or more alignment datum 104, 106, 108 and 110 to calibrate the CMM to the position and orientation of the holding gage assembly 10 for a measurement operation.

Figure 4:
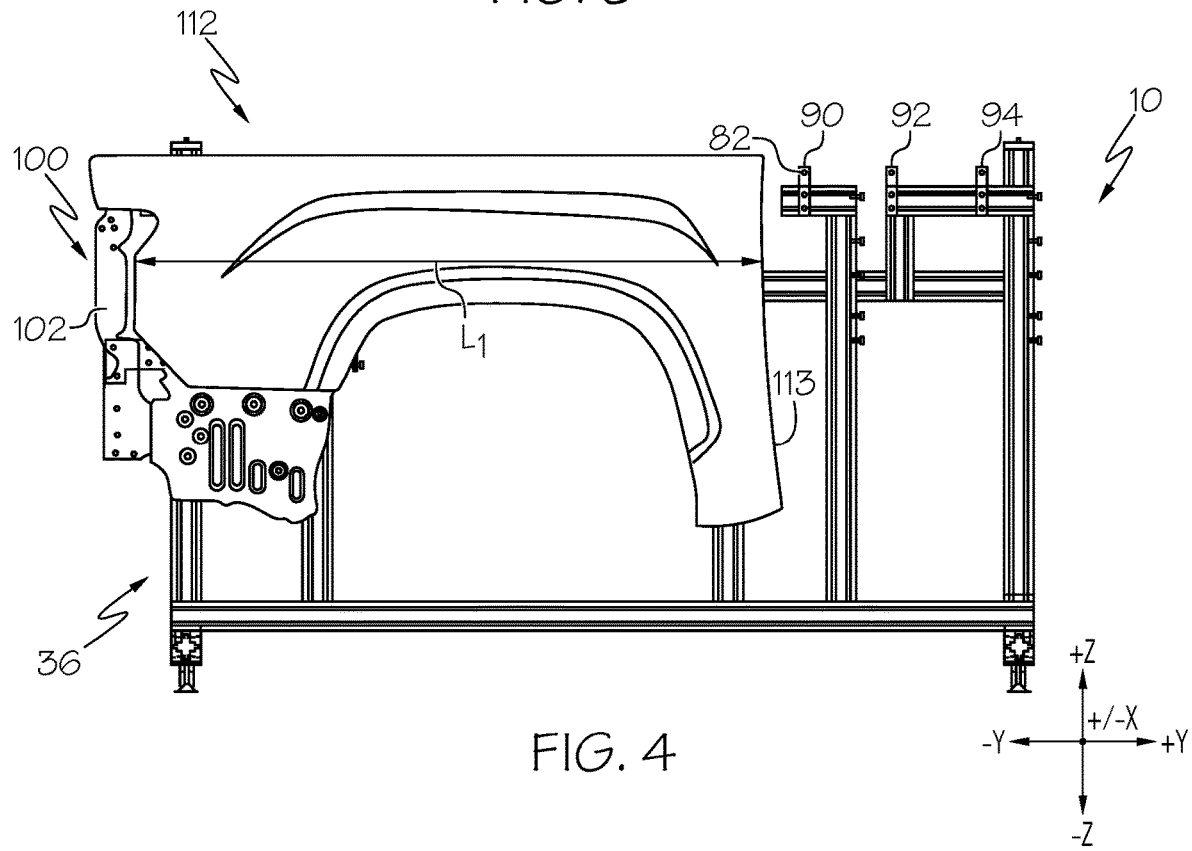
FIG. 4 illustrates the holding gage assembly of FIG. 1 in use with a vehicle panel assembly of a first length, according to one or more embodiments shown and described herein.
Figure 5:
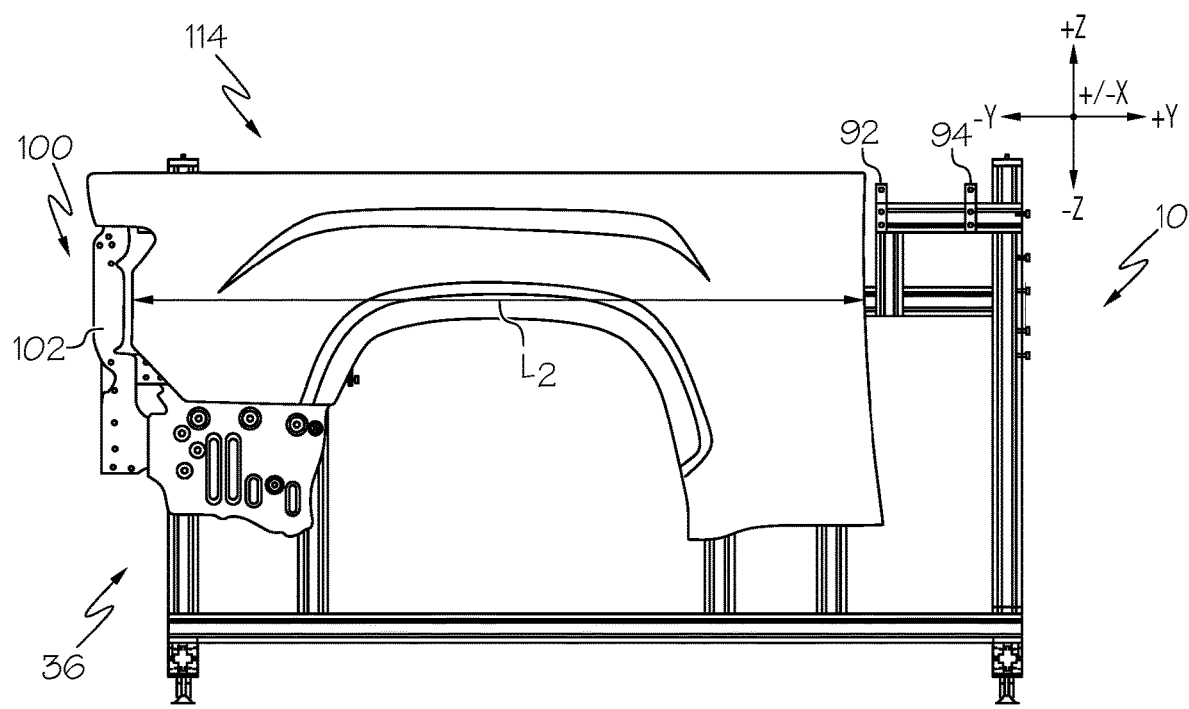
FIG. 5 illustrates the holding gage assembly of FIG. 1 in use with a vehicle panel assembly of a different, second length, according to one or more embodiments shown and described herein.
Figure 6:
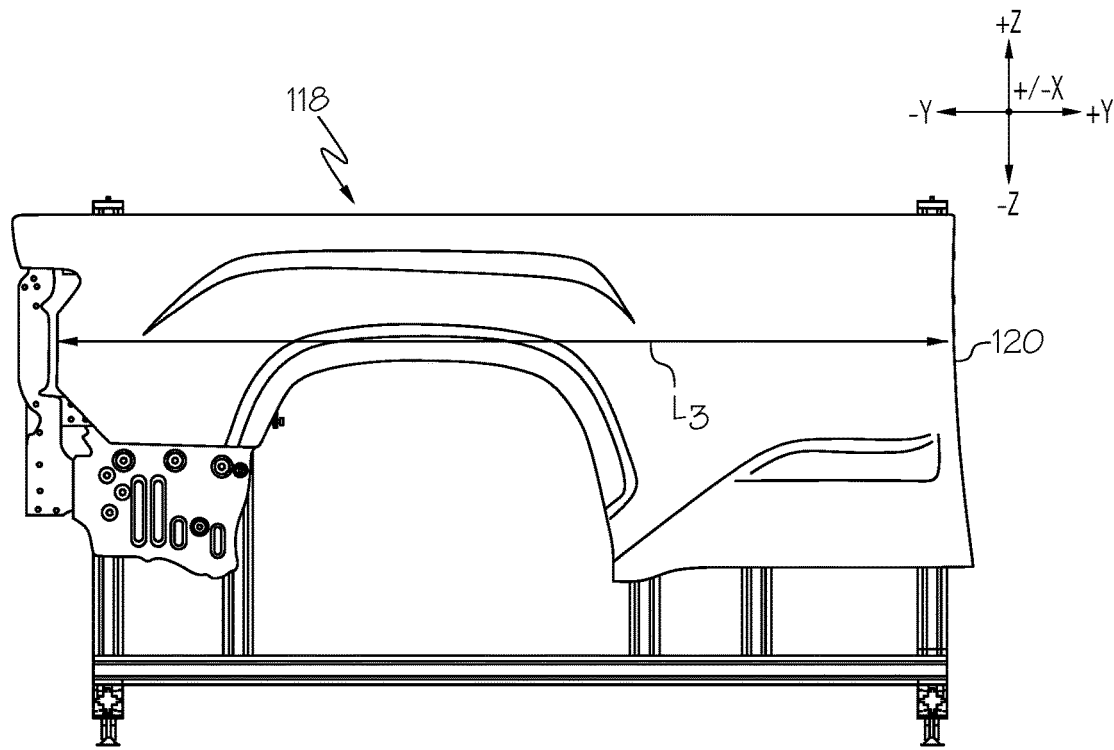
FIG. 6 illustrates the holding gage assembly of FIG. 1 in use with a vehicle panel assembly of a different, third length, according to one or more embodiments shown and described herein.

Referring now to FIGS. 4-6, operation of the holding gage assembly 10 is shown. It should be noted that the sides 34 and 36, as shown, may be mirror images of each other and thus, while operation of side 36 is described, the description applies equally to side 34. Referring first to FIG. 4, a vehicle panel assembly 112 is illustrated mounted on the side 36 of the gage body 12. The vehicle panel assembly 112 may be an assembly of several sub-panels or other sub-components to form the overall vehicle panel assembly structure. The vehicle panel assembly 112 is placed upon the datum locations 82 of the first set of datum members 72, 74, 76, 78 and 80 (FIG. 2). The clamp arm 102 may be used to position the vehicle panel assembly 112 longitudinally while the datum locations 82 orient the vehicle panel assembly 112 and provide vertical positioning.

As can be seen in FIG. 4, the longitudinal length $L_1$ of the vehicle panel assembly 112 (e.g., 5 feet) is such that a forward edge 113 terminates before reaching the second set of datum members 90, 92 and 94 while the vehicle panel assembly 112 rests on the first set of datum members 72, 74, 76, 78 and 80. In this position, the vehicle panel assembly 112 can be measured using the CMM and this data can be compared to specification data by a computer communicatively coupled to the CMM.

Referring to FIG. 5, the longitudinal length $L_2$ of another vehicle panel assembly 114 (e.g., 6.5 feet) is greater than that of the vehicle panel assembly 112. In this example, a forward edge 116 extends past the datum member 90 of the second set of datum members 90, 92 and 94 and terminates before the datum member 92 while the vehicle panel assembly 114 rests on the first set of datum members 72, 74, 76, 78 and 80.

Referring to FIG. 6, the longitudinal length $L_3$ of another vehicle panel assembly 118 (e.g., 8 feet) is greater than that of the vehicle panel assemblies 112 and 114. In this example, a forward edge 120 extends past the datum members 90, 92 and 94 of the second set of datum members 90, 92 and 94 and terminates after the datum member 94 while the vehicle panel assembly 118 rests on the first set of datum members 72, 74, 76, 78 and 80.

The above-described holding gage assemblies allows for digitally measuring vehicle panel assemblies of different shapes/sizes without any need to change the configuration of the holding gage assemblies for the different vehicle panel assemblies. The holding gage assemblies can be moved and re-oriented and then a CMM can be calibrated using alignment datums carried by the holding gage assemblies. The holding gage assemblies provide a fixture for positioning the vehicle panel assemblies in a precise, repeatable fashion.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of supporting vehicle panel assemblies of different lengths, the method comprising:
supporting a first vehicle panel assembly having a first length on a holding gage assembly comprising horizontally aligned datum locations of a first set of datum members that support the first vehicle panel assembly thereon, the holding gage assembly comprising:
a gage body formed of multiple, interconnected rails comprising a first upper cross-rail extending longitudinally along a first length of the gage body at one side of the gage body, a second upper cross-rail extending parallel to and alongside of the first upper cross-rail at an opposite side of the gage body and a third upper cross-rail that is parallel to the first upper cross-rail and the second upper cross-rail and spaced longitudinally therefrom, the first set of datum members connected to and extending outwardly from the first upper cross-rail and the second upper cross-rail, the third upper cross-rail comprising a second set of datum members that are connected to and extend outwardly from the third upper cross-rail;
clamping the first vehicle panel using a clamp arm mounting structure comprising a clamp arm that is part of the holding gage assembly to fix a longitudinal position of the first vehicle panel assembly; and supporting a second vehicle panel assembly having a second length that is greater than the first length on the datum locations of the first set of datum members, the second vehicle panel assembly extending longitudinally beyond the datum locations of the first set of datum members to at least one datum location of the second set of datum members.

2. The method of claim 1 further comprising removing the first vehicle panel assembly from the holding gage assembly before the step of supporting the second vehicle panel assembly.

3. The method of claim 1 further comprising:
measuring the first vehicle panel assembly using a coordinate measurement machine while the first vehicle panel assembly is supported on the holding gage assembly; and
removing the first vehicle panel assembly from the holding gage assembly.

4. The method of claim 3 further comprising calibrating the coordinate measurement machine using alignment datums carried on the holding gage assembly.

5. The method of claim 1 further comprising supporting a third vehicle panel assembly having a third length that is greater than the first and second lengths on the datum locations of the first set of datum members, the third vehicle panel assembly extending longitudinally beyond the datum locations of the first set of datum members to at least two datum locations of the second set of datum members.

6. The method of claim 4, wherein the datum locations of the first set of datum members and the second set of datum members are longitudinally aligned.

7. The method of claim 6, wherein the datum locations of the first set of datum members are spaced equidistantly in the longitudinal direction.

8. The method of claim 7, wherein the datum locations of the second set of datum members are spaced equidistantly in the longitudinal direction.

9. The method of claim 8, wherein a first spacing of the datum locations of the first set of datum members in the longitudinal direction is different from a second spacing of the datum locations of the second set of datum members in the longitudinal direction.

\* \* \* \* \*